United States Patent [19]

Flechsig et al.

[11] Patent Number: 5,581,021
[45] Date of Patent: Dec. 3, 1996

[54] METHOD AND APPARATUS FOR OPTIMIZING PIEZOELECTRIC SURFACE ASPERITY DETECTION SENSOR

[75] Inventors: Karl A. Flechsig, Los Gatos; Chih-Kung Lee, Cupertino; Sylvia L. Lee, San Jose; Ullal V. Nayak, San Jose; Timothy C. O'Sullivan, San Jose, all of Calif.

[73] Assignee: International Business Machines Corporation, Armonk, N.Y.

[21] Appl. No.: 482,536

[22] Filed: Jun. 7, 1995

Related U.S. Application Data

[63] Continuation of Ser. No. 174,484, Dec. 27, 1993, Pat. No. 5,450,747.

[51] Int. Cl.$^6$ .............................. G01B 5/28; H01L 41/047
[52] U.S. Cl. ........................ 73/105; 73/DIG. 4; 310/319
[58] Field of Search ................. 73/104, 105, DIG. 4; 310/314, 316, 317, 318, 319, 365, 368

[56] References Cited

U.S. PATENT DOCUMENTS

| | | | |
|---|---|---|---|
| 1,869,556 | 8/1932 | Giebe et al. | |
| 2,292,886 | 8/1942 | Mason | 171/327 |
| 3,421,109 | 1/1969 | Wiggins et al. | 331/116 |
| 3,713,130 | 1/1973 | Armer | 340/267 R |
| 3,882,332 | 5/1975 | Frymoyer | 310/8.1 |
| 4,072,936 | 2/1978 | Spirig | 340/274 |
| 4,075,600 | 2/1978 | Sims et al. | 340/9 |
| 4,431,938 | 2/1984 | Inoue | 310/366 |
| 4,469,979 | 9/1984 | Chuang | 310/370 |
| 4,479,090 | 10/1984 | Frater et al. | 324/454 |
| 4,532,802 | 8/1985 | Yeack-Scranton et al. | 73/432 R |
| 4,634,917 | 1/1987 | Dvorsky et al. | 310/328 |
| 4,635,139 | 1/1987 | Nguyen et al. | 368/25 |
| 4,644,215 | 2/1987 | Iwasaki et al. | 310/367 |
| 4,812,927 | 3/1989 | Fechner | 360/75 |
| 4,868,447 | 9/1989 | Lee et al. | 310/328 |
| 4,933,588 | 6/1990 | Greer | 310/313 |
| 4,942,609 | 7/1990 | Meyer | 360/25 |
| 5,038,625 | 8/1991 | Chen | 73/865.9 |
| 5,060,516 | 10/1991 | Lau et al. | 73/602 |
| 5,075,651 | 12/1991 | Pradal | 333/187 |
| 5,126,615 | 6/1992 | Takeuchi et al. | 310/330 |
| 5,168,412 | 12/1992 | Doan et al. | 360/103 |
| 5,282,103 | 1/1994 | Hatch et al. | 360/104 |
| 5,309,303 | 5/1994 | Hsia et al. | 360/103 |

FOREIGN PATENT DOCUMENTS 4-178920(A) 11/1990 Japan.

OTHER PUBLICATIONS

J. Patel et al., "Efficient Piezoelectric Glide Transducer for Magnetic Recording Disk Quality Assurance", IBM Technical Disclosure Bulletin, vol. 34, No. 4A, Sep. 1991, p. 459.

*Primary Examiner*—Hezron E. Williams
*Assistant Examiner*—Daniel S. Larkin
*Attorney, Agent, or Firm*—Ingrid M. Foerster

[57] ABSTRACT

Disclosed is a method and apparatus for sensing the vibrational response of a slider of predetermined dimensions during contact with one or more surface asperities on a recording surface, separating the response into its individual bending mode frequency component responses, determining one or more bending mode frequency responses which display monotonic behavior with increasing asperity interference, and designing a mode selection sensor optimized to detect the monotonic bending mode frequency identified. The mode enhanced sensor is designed by first analyzing the stress distribution of the slider corresponding to the monotonic bending mode frequency, identifying regions of the slider which experience substantially positive or substantially negative stress, and partitioning the upper conductive layer of a piezoelectric sensor to form a partitions corresponding to each of the identified regions. The sensor may be further enhanced by tailoring the partitions to exclude undesirable stress contributions.

10 Claims, 15 Drawing Sheets

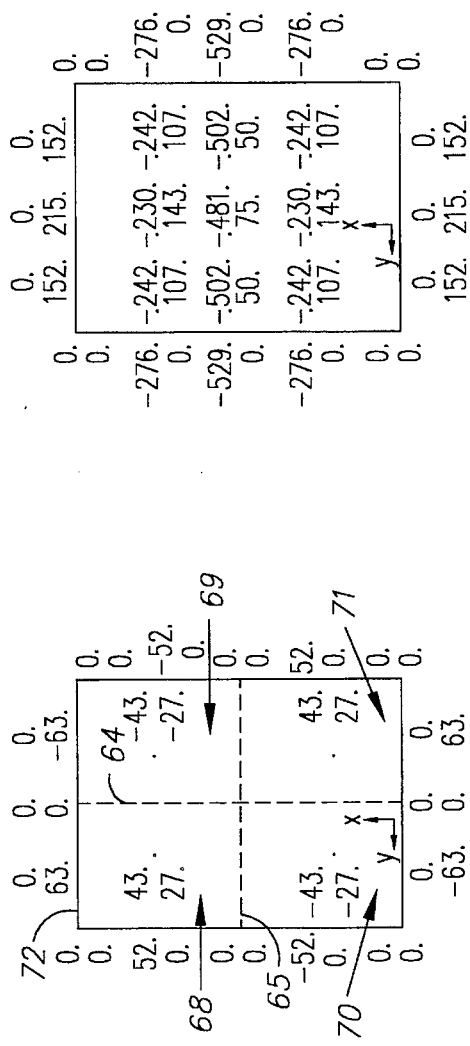
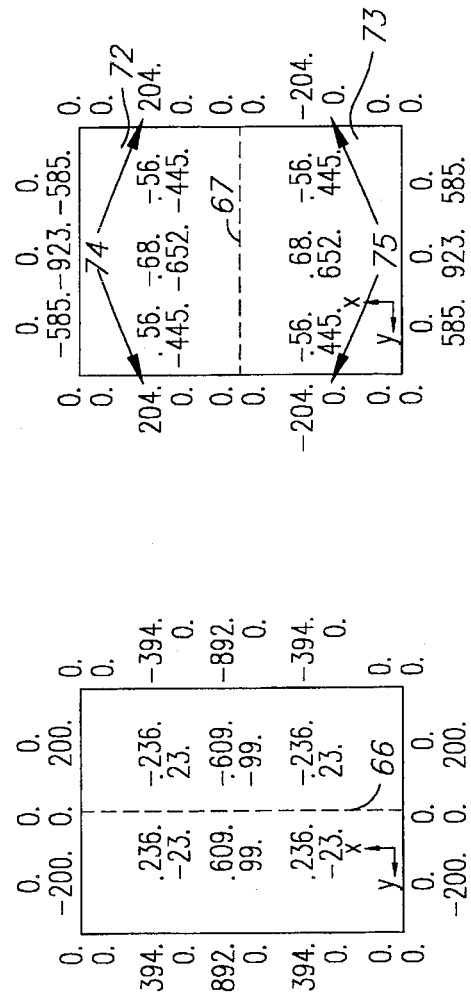
FIG. 5A
FIG. 5B
FIG. 5D
FIG. 5E
FIG. 5C

METHOD AND APPARATUS FOR OPTIMIZING PIEZOELECTRIC SURFACE ASPERITY DETECTION SENSOR

This application is a continuation of application Ser. No. 08/174,484, filed on Dec. 27, 1993, now U.S. Pat. No. 5,450,747, entitled "APPARATUS FOR OPTIMIZING PIEZOELECTRIC SURFACE ASPERITY DETECTION SENSOR", in the name of Karl A. Flechsig, Chih-Kung Lee, Sylvia L. Lee, Ullal V. Nayak and Timothy C. O'Sullivan.

BACKGROUND OF THE INVENTION

1. Field of the Invention

The present invention relates generally to an apparatus for surface analysis of a recording surface. In particular, it relates to an apparatus for optimizing a piezoelectric contact detection sensor to provide a monotonic response with increasing asperity interference.

2. Background

In a conventional magnetic storage drive, an air bearing slider supports a magnetic transducer in close proximity to a relatively moving recording surface. The recording surface typically comprises a rigid disk coated with a layer of magnetic material applied by a method such as spin-coating or sputtering. Coated disks must be free of asperities to assure long-term reliability and the data integrity at the head to disk interface, since asperities can lead to undesirable slider-disk contact or "head crash".

Glide height testing is one means for assuring an asperity-free disk. A slider is flown over the recording disk at a height equal to or below the desired data head fly height to analyze impacts between the slider and the disk surface. The slider includes one or more piezoelectric sensors bonded to an upper surface facing away from the recording surface. Piezoelectric materials are used because they generate an electric charge in response to internal stress. As the slider experiences rigid body displacement and flexural deformation, the adjacent sensor responds by generating a charge signal which may be monitored.

A dominant practice in the art has been to monitor the low frequency piezoelectric signals corresponding to rigid body displacement and indicative of slider contact with large asperities on the disk surface. But as sliders decrease in size, magnetic transducers become vulnerable to relatively small asperities. Experience among those skilled in the art has shown a class of asperities (e.g. disk delaminations) that are too small to cause head crashes, yet large enough to result in slider-disk contact adversely affecting device reliability. This class of asperities generates high frequency vibrations in the test slider which cannot be detected adequately by conventional means.

The optimal sensitivity to small disk asperities is obtained by monitoring the high frequency vibrations of a test slider. Yet the high frequency components, or bending mode frequencies, of the response signal may vary greatly. Many modes display a non-monotonic response with increasing asperity interference height, i.e. the distance between the tip of an asperity and the minimum slider fly height. Non-monotonic modes indicate the occurrence of disk contact but provide no useful information about the size of the asperity causing contact.

The trend in recent years has been to produce storage systems having smaller sliders than the conventional "large" or "100%" sliders (e.g. 4 mm long by 3.2 mm wide). Reductions in slider size necessitate a corresponding reduction in test slider dimensions for equivalent compliance to the recording surface. This reduction results in a weaker piezoelectric signal and poor signal-to-noise (S/N) ratio. S/N ratio has also been shown to decrease with decreasing glide height. Thus, optimizing test slider sensitivity becomes increasingly important for smaller slider designs.

It is therefore desirable for a slider of predetermined size and fly height to identify one or more high frequency bending modes displaying monotonic behavior with increasing asperity interference. To that end, it becomes necessary to analyze the various bending mode frequencies individually. One method for isolating bending mode components is to electronically filter the high frequency signal generated by the piezoelectric sensor. But such filtering requires several filtering stages and becomes difficult with low signal to noise ratios.

One alternative to electronic filtering is to select a sensor design which facilitates the separation and/or detection of signal components of different frequencies. U.S. Pat. No. 4,532,802 describes a piezoelectric slider for isolating the low frequency components of a test slider signal. The apparatus comprises a slider having four piezoelectric transducers positioned on its upper surface facing away from the disk. Two sensors are positioned at the leading edge and two at the trailing edge. Independent examination of the low-frequency output signal from each transducer enables one to identify the components corresponding to pitch, roll, and vertical acceleration. This patent does not address analysis of high-frequency bending modes, and the head is both costly and complex to manufacture.

An IBM Technical Disclosure Bulletin article entitled "Efficient Piezoelectric Glide Transducer for Magnetic Recording Disk Quality Assurance", Vol. 34, No. 4A, Sep. 1992, describes a test slider comprising two piezoelectric transducers disposed on the upper surface of a slider about its longitudinal axis. Each half is oppositely poled with respect to the other. The arrangement increases the sensor's sensitivity to three low-frequency bending modes indicative of slider rigid body motion. Again, detection of the high frequency bending modes is not discussed.

U.S. Pat. No. 4,868,447 discloses a piezoelectric sensor comprising one, two or four layers of stacked laminae, each layer responsive to a different bending mode frequency. The disclosed apparatus does not teach the selection of a monotonic high frequency bending mode for small asperity detection in glide height testing.

What is needed, for a slider of predetermined size and fly height, is an apparatus for analyzing the high frequency components of a test slider response during small asperity contact to identify one or more optimal high frequency bending modes displaying monotonic behavior for increasing asperity interference height.

SUMMARY OF THE INVENTION

It is an object of the present invention to provide an apparatus for designing an optimized piezoelectric interaction detection sensor for the detection of small surface asperities at a mechanical interface.

It is a further object of the present invention to provide a test slider for detecting small asperities at the slider-disk interface of a disk drive system.

It is another object of the present invention to provide an apparatus for identifying a high frequency vibration mode of a slider which is monotonic with increasing asperity interference height at the slider-disk interface.

Another object of the present invention is to sense and isolate the high-frequency responses of a test slider flying over a magnetic recording disk to identify bending mode frequencies having a monotonic response to increasing asperity interference height.

It is a further object of the present invention to provide, for a slider of predetermined size and flying height, a piezoelectric sensor design optimized to detect a predetermined monotonic high frequency bending mode response of the slider.

Accordingly, the present invention is an apparatus for designing an optimized modal sensor for a slider having particular dimensions. The final sensor design is optimized to detect a bending mode frequency with a monotonic response to increasing surface asperity interference (for small asperities). Optimization is achieved by 1) identifying the bending mode frequencies for a particular slider, 2) monitoring those frequencies for increasing or decreasing asperity interference to determine which provides the most desirable (i.e. monotonic) response, and then 3) selecting a sensor design which facilitates detection of that bending mode but is also practical from a manufacturing point of view.

A four-quadrant modal sensor formed from a slab of PZT-5A is the preferred apparatus for steps 1) and 2), because its symmetry allows isolation and study of a relatively large number of bending mode frequencies corresponding to a particular slider. The sensor is mounted to a slider having the dimensions of interest. In circumstances where the slider under study is too small to accommodate a four-quadrant design, one or two two-region sensors are used.

Using a two quadrant sensor limits the number of bending mode frequencies that can be detected, since one can only add or subtract the signal detected in one region to/from the signal detected in the other region to extract frequencies. However, if the bending mode frequencies isolated with one two-region design (e.g. that shown in FIGS. 7(a) and 7(b)) do not display monotonic behavior for increasing asperity interference, one can isolate other bending modes by using an alternative two-region design (e.g. that of FIGS. 14(a) and 14(b)). However, the combined use of these two sensors does not allow isolation of the bending mode frequencies obtained by adding/subtracting the diagonal quadrants of a four-quadrant sensor.

If an isolated bending mode frequency of a slider under study shows monotonic behavior for increasing asperity interference, then one proceeds to step 3) to select an optimal sensor design for a slider having the dimensions of interest to enable sensing of that frequency. If the frequency can be isolated using a two-region sensor, this design is selected, since it is easier to manufacture than a four-quadrant sensor. However, if the bending mode can only be isolated by adding/subtracting diagonal quadrants, the more complicated four-quadrant design is selected for the slider dimensions under study. Once a design is selected, it can be further optimized to eliminate undesirable signal contributions.

Although the invention is described with reference to magnetic recording disks, it should be understood that the method and apparatus disclosed may be applied to other systems in which reliable mechanical interfaces are desirable without departing from the spirit and scope of the invention.

BRIEF DESCRIPTION OF THE DRAWING

The foregoing and other objects, features and advantages of the present invention will be apparent from the following detailed description of the preferred embodiments, with reference to the accompanying figures of the drawing, in which:

FIGS. 5(a)–(e) show the surface stresses of a slider corresponding to five bending mode frequencies;

DESCRIPTION OF THE PREFERRED EMBODIMENT

Figure 1:
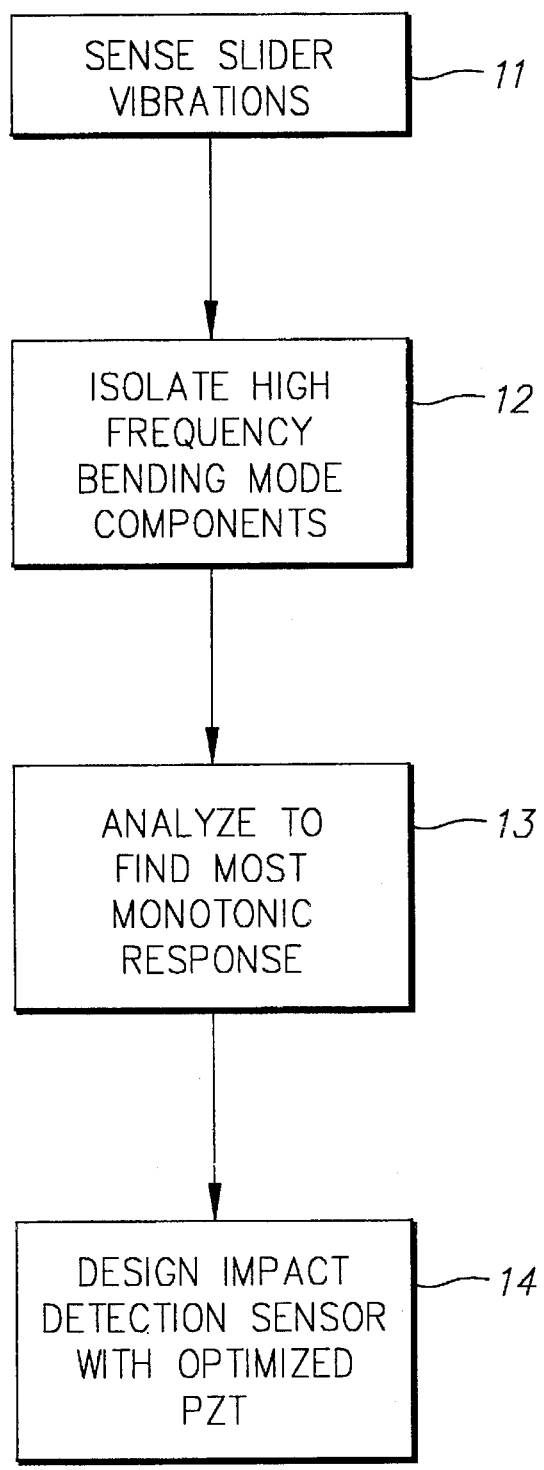
FIG. 1 is a flow diagram showing the steps of the optimizing method of the present invention.

FIG. 1 is a flow diagram of the optimization method according to the present invention. In a first step 11, a slider is suspended over a rotating magnetic disk. Contact between the slider and disk is manifested by high frequency slider vibrations, which are transformed into an electrical signal by sensing means such as a piezoelectric sensor. Next 12, the sensed electrical signal is processed to identify its high frequency bending mode components. Once identified, the modes are analyzed over a range of decreasing flying heights to determine the mode(s) displaying the most monotonic response to increasing asperity interference (step 3). The fourth and final step 14 entails designing an interaction detection piezoelectric sensor with enhanced sensitivity to the identified monotonic bending mode component(s). The foregoing steps shall be described in further detail below.

I. Sensing the Slider Response

Figure 2:
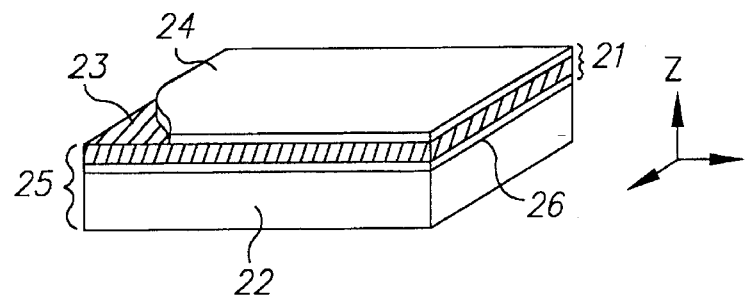
FIG. 2 is a perspective view of a slider mounted with a piezoelectric sensor.

As shown in FIG. 2, slider responses are sensed by a sensing structure 25 comprising a piezoelectric sensor 21 mounted to a slider 22. The sensor 21 includes a thin layer of piezoelectric material 23 coated on each of its two faces with a layer 24, 26 of conductive material. In a preferred embodiment for a "large" or "100%" slider, the piezoelectric material comprises a 0.20 mm slab of commercially available PZT-5A plated on each surface with a 0.05 mm layer of nickel, although it will be understood that other suitable piezoelectric and conductive materials may also be used. One of the layers 26 is bonded to the upper surface of a slider 22. The piezoelectric material 23 generates an electric charge signal in response to internal stresses caused by deformation experienced in the adjacent slider 22. One of the conductive layers 26 is grounded, and the other 24 is electrically coupled to amplifying, processing and monitoring means (not shown).

Figure 3A:
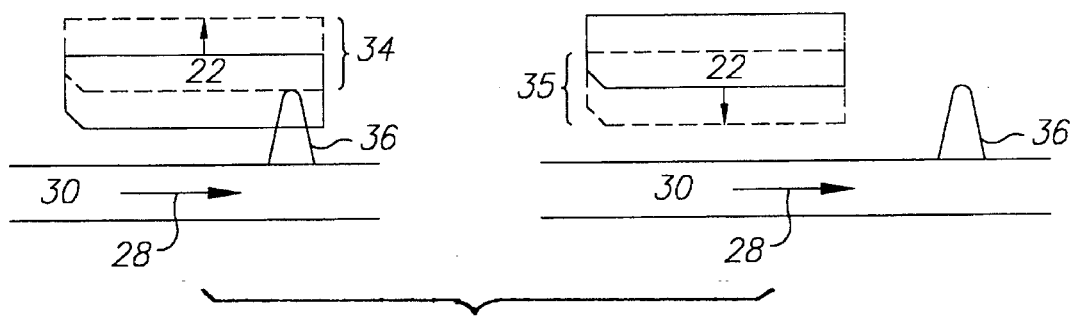
FIG. 3(a) shows the rigid body displacement experienced by a slider due to impact with a surface asperity.
Figure 3B:
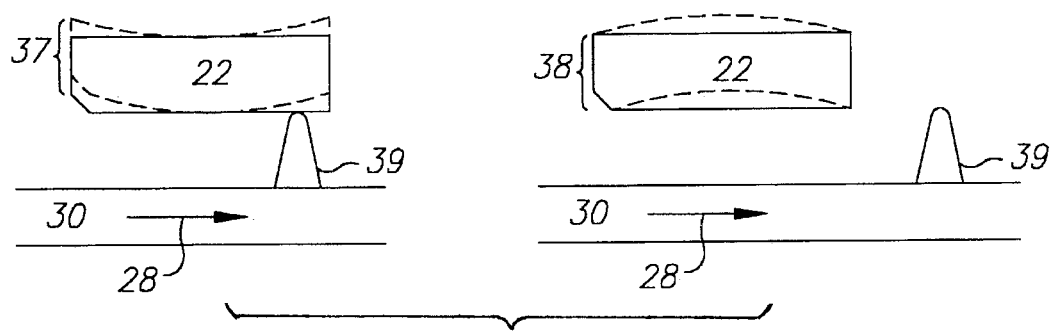
FIG. 3(b) shows the out-of-plane deformations experienced by a slider due to impact with a surface asperity.

FIGS. 3(a) and (b) illustrate two types of displacement experienced by a slider 22 as it flies over the rotating disk 30. The disk 30 is moving relative to the slider 22 in the direction of the arrow 28. Rigid body displacement is indicated by the dashed lines 34, 35 in FIG. 3(a). Such out-of-plane displacement is generally caused by slider impact with a large surface asperity 36 or a change in slider acceleration relative to the disk 30. Flexural deformation or bending is indicated by the dashed lines 37, 38 of FIG. 3(b). Such deformation occurs whenever the slider contacts a large or small surface asperity 39. Rigid body motion generally occurs at much lower frequencies than flexural deformation, and as such is not relevant to the present invention. For small asperities, the piezoelectric signal from the flexural deformation is dominant.

FIGS. 4(a)–(e) present finite element simulation results for the displacement corresponding to the five lowest order vibration modes in a large slider after impact with a disk asperity. Each mode shape shown in FIGS. 4(a)–(e) corresponds to a particular frequency, sometimes referred to as a "bending mode" frequency. It will be understood that these simulation results are also similar to displacements experienced by sliders of smaller dimensions. In each of the figures shown, out-of-plane or normal displacement away from the disk surface (i.e. out of the plane of the page) is indicated by a "+" sign. Similarly, displacement in the direction of the disk surface (i.e. into the page) is shown by a "−" sign. Dashed or modal lines 41–51 delimit regions of positive and negative displacement. Numeric values in each delimited region represent the normalized local displacement of that region at the point shown. For example, in FIG. 4(a), the "1.2" and "+" shown in the upper right-hand region 57 indicate that there is a 1.2 normalized displacement occurring in this position away from the disk surface of 1.2. A substantially equal positive displacement occurs at the lower left-hand region 58. Similarly, the "−1.2" and "−" shown in the upper left-hand region indicates that there is a 1.2 normalized displacement toward the disk in this region. An equal negative displacement occurs in the lower right-hand region 59. The value "−4.4" at diagonal corners of the negatively displaced regions 56, 59 tell an observer that each of these regions 56, 59 experiences a normalized displacement of 4.4. at its corner in the direction of the disk surface.

Figure 4A:
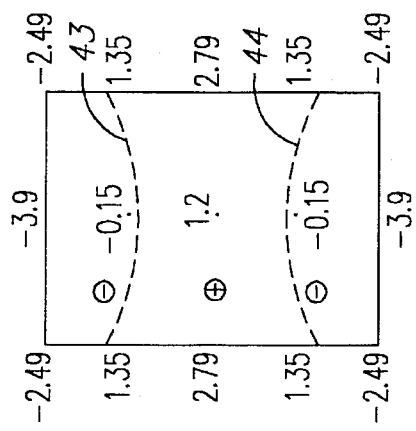
FIGS. 4(a)–(e) show the out-of-plane modal displacements of a slider corresponding to five bending mode frequencies.
Figure 4B:
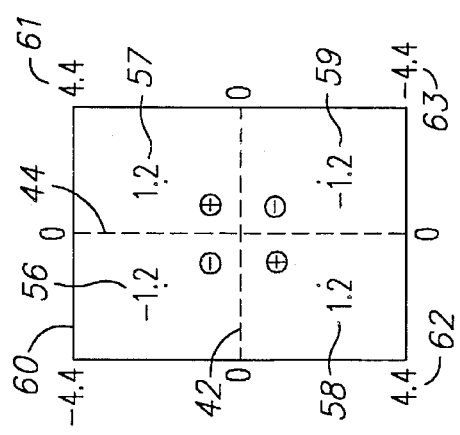
Figure 4C:
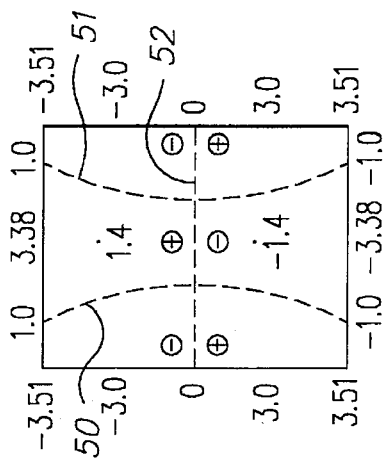
Figure 4D:
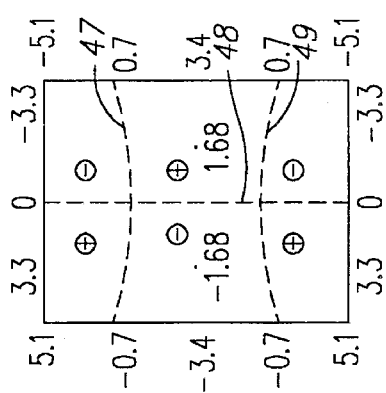
Figure 4E:
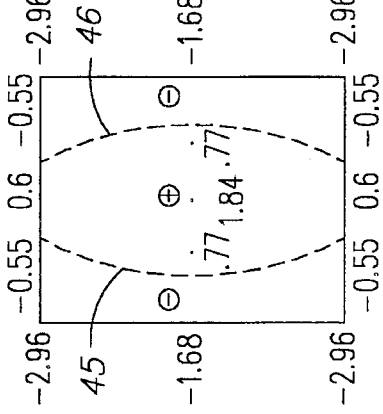

In addition to out-of-plane displacement, the flexural deformations corresponding to the bending mode frequencies of a slider 22 generate in-plane components of surface stress. FIGS. 5(a)–(e) show the surface stresses in the PZT calculated by finite element analysis, corresponding to the out-of-plane bending mode displacements shown in FIGS. 4(a)–(e). Thus each pair of corresponding figures, e.g. FIGS. 4(a) and 5(a), represents a unique flexural bending mode frequency of the 100% or 'minislider' (4.0 mm 1×3.2 mm w×0.85 mm h). Similar results can be obtained for sliders having smaller dimensions, e.g. 70 % or 'microsliders' (2.8 mm 1×2.2 mm w×0.6 mm h), 50–63% or 'nanosliders' (2.0–2.5 mm 1×1.7 mm w×0.425 mm h) and 33–25% 'picosliders' (1.0–1.3 mm 1×1.0 mm w×0.3mm h). Pairs of values corresponding to points shown for each mode represent normalized components of stress at that point. For example, a positive vertical coordinate such as "43" in region 68 of FIG. 5(a) indicates a positive stress component $\sigma_x$ along the x-axis. Similarly, a positive horizontal component such as "27" in region 68 indicates a positive stress component $\sigma_y$ along the y-axis. Dashed lines 64–67 emphasize the symmetry of surface stress. It should be understood that the normalized numeric values shown in FIGS. 4 and 5 are exemplary only, and will vary with slider dimensions. The directions and symmetry of in-plane and out-of-plane displacements, however, should essentially be the same for other sliders.

Figure 6A:
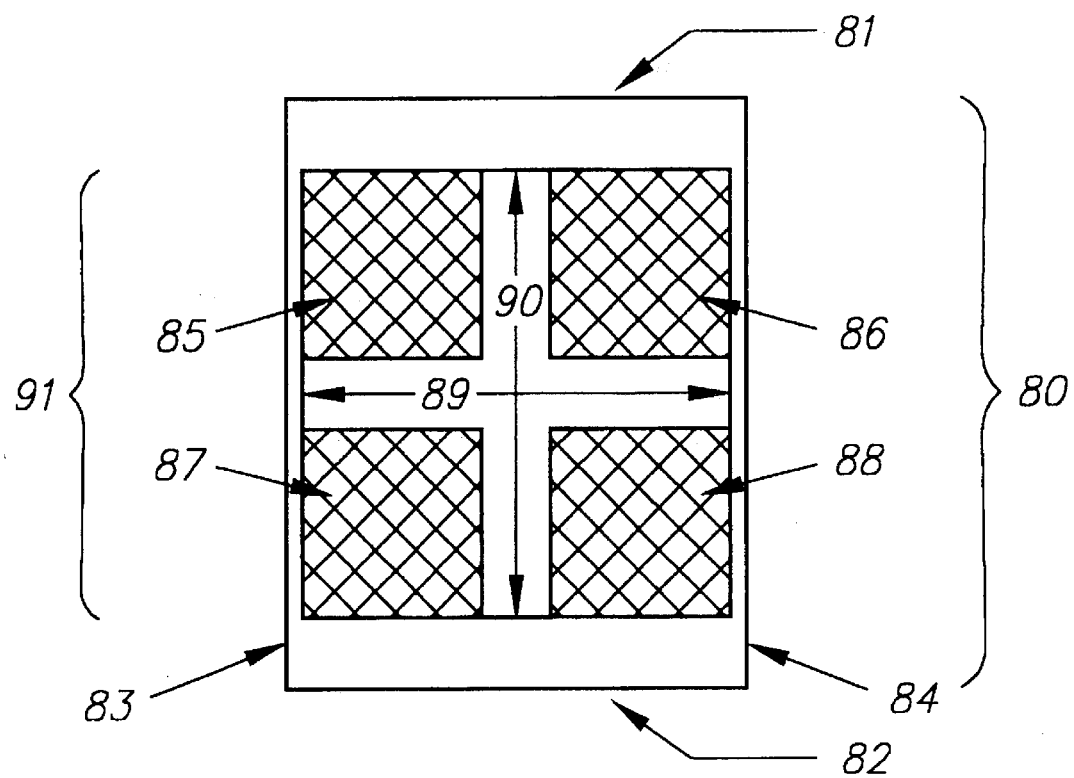
FIGS. 6(a)–(b) are plane and side views, respectively, of the preferred modal sensor for a large slider.
Figure 6B:
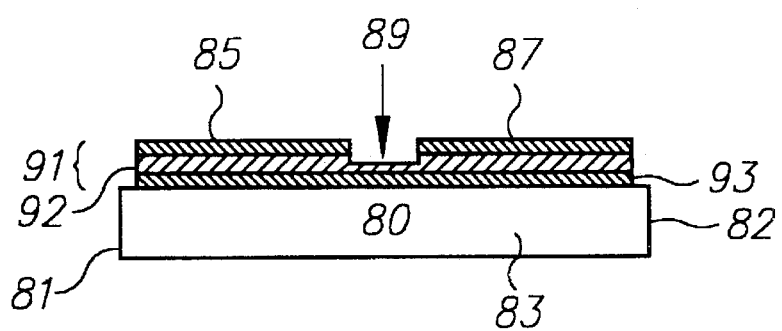
Figure 9:
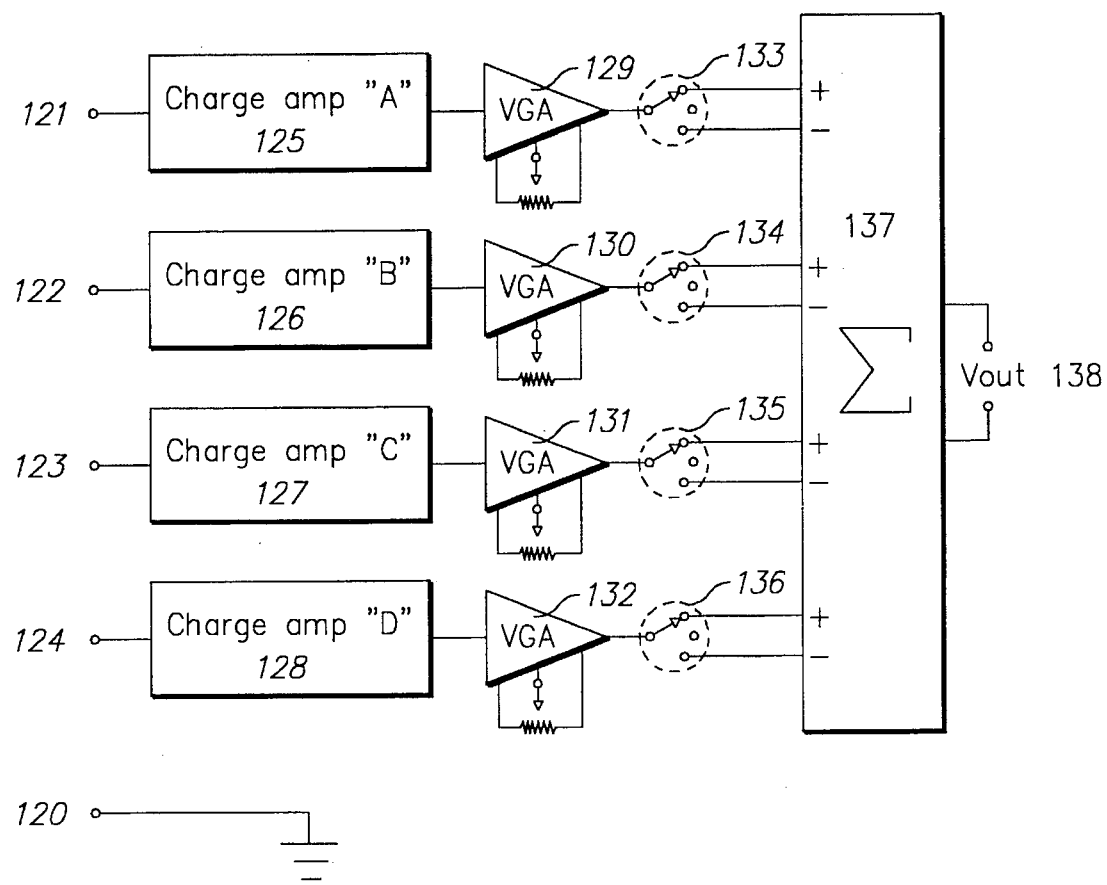
FIG. 9 is a circuit diagram of the preferred signal processing logic used in the method of the present invention.
Figure 10A:
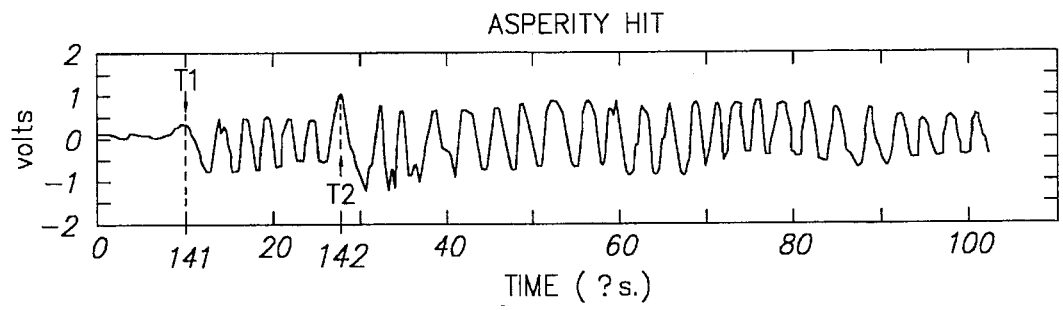
FIGS. 10(a)–(c) represent the slider response to asperity contact, the power spectrum of the response, and the power spectrum of the slider response without asperity contact for the first bending mode of a slider.
Figure 10B:
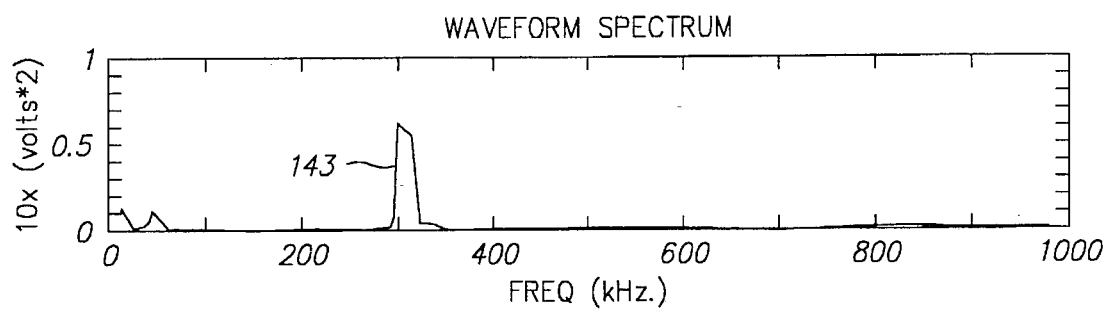
Figure 10C:
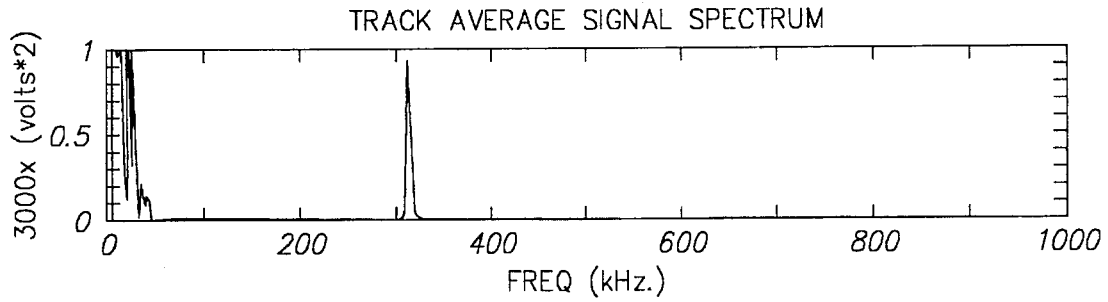

A preferred embodiment of the mode selection sensor used to isolate bending mode components in a slider response is shown in FIGS. 6(a) and 6(b). A piezoelectric sensor 91 is mounted to a slider 80 having a leading edge 81, a trailing edge 82, a hub side 83 and a rim side 84. The sensor 91 comprises a slab of piezoelectric material 92 such as PZT-5A coated with a continuous layer of conductive material such as nickel on each of its lower and upper surfaces. PZT-5A is preferred because it provides a relatively large charge output compared to other piezoelectric materials such as PVF2. An advantage of this material is the relation of its charge response to the sum of the in-plane stresses ($\sigma_x+\sigma_y$) in the piezoelectric layer. This relationship greatly simplifies the claimed optimization analysis and design process. It should be understood, however, that other piezoelectric materials having similar properties may be used. The lower conductive layer 93 of the sensor 91 is continuous and is electrically grounded to port 120 (FIG. 9). The upper conductive layer is partitioned into four electrically isolated regions 85–88 symmetrical about the lateral and longitudinal axes of the sensor 91. Each quadrant 85–88 is electrically coupled to input ports 121–124 of a charge amplifier. (See FIG. 9). The four-quadrant sensor configuration is selected for the PZT-5A sensor because it takes advantage of the symmetries of the in-plane stresses shown in FIGS. 5(a)–(e). In a preferred method, the isolated regions are formed by cutting channels 89, 90 through the conductive layer by a suitable process such as ion milling, chemical etching, reactive ion etching (RIE) or laser ablation. It shall be understood that the four-quadrant configuration may also be formed on the piezoelectric material 92 by sputtering or chemical vapor deposition through a mask, silk-screening, or other appropriate means.

Figure 7A:
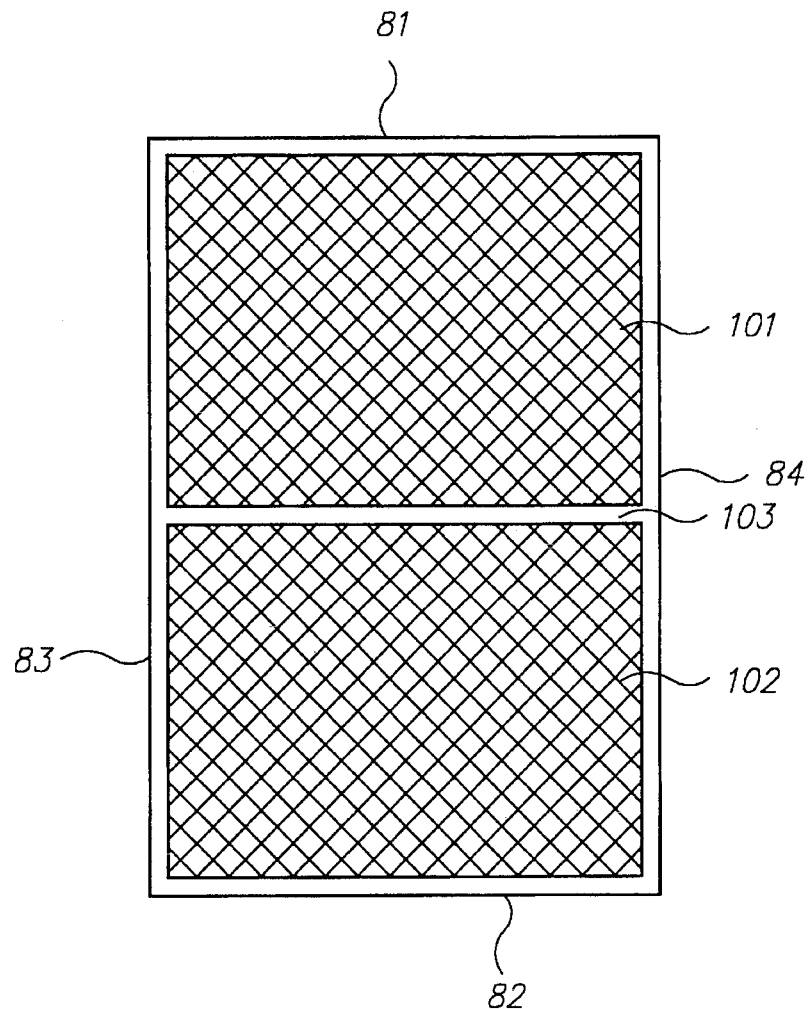
FIG. 7(a)–(b) are plane and side views, respectively, of the preferred modal sensor for a slider with space limitations.
Figure 7B:
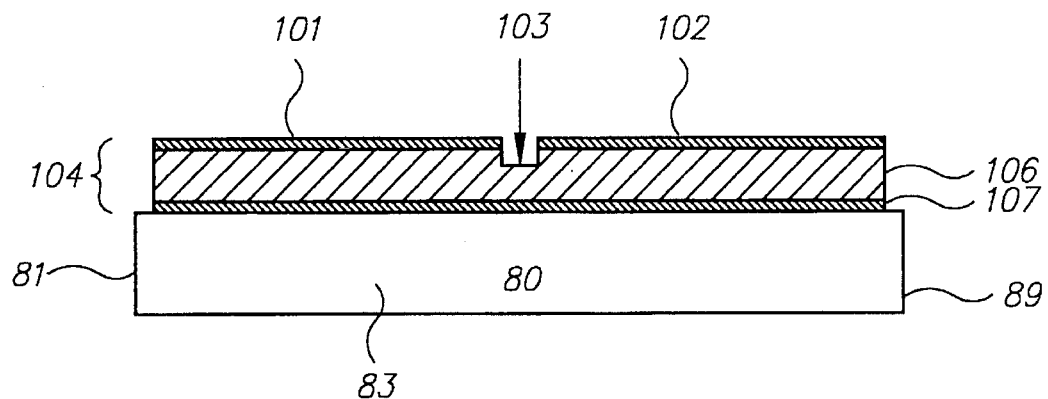

For sliders with limited space, an alternative mode selection sensor is preferred and is shown in FIGS. 7(a) and 7(b). The piezoelectric sensor 104 comprises a slab of piezoelectric material 106 such as PZT-5A coated on its upper and lower surfaces with conductive material such as nickel. The lower layer 107 of conductive material is continuous and grounded. The upper layer comprises two electrically isolated regions 101, 102 formed by cutting a lateral groove 103 into the conductive material and preferably into a portion of the piezoelectric material 106 as well. Each region 101, 102 is coupled to an input port of a charge amplifier 121-122 (FIG. 9).

II. Isolating the Bending Mode Components

The four-quadrant sensor permits separation of the bending modes characterized by FIGS. 4 and 5 by subtraction or summation of the signals generated by each quadrant. For convenience, the quadrants are designated as LEH, LER, TEH and TER, according to their respective proximities to the Leading Edge Hub rail, Leading Edge Rim rail, Trailing Edge Hub rail and Trailing Edge Rim rail.

Figure 8A:
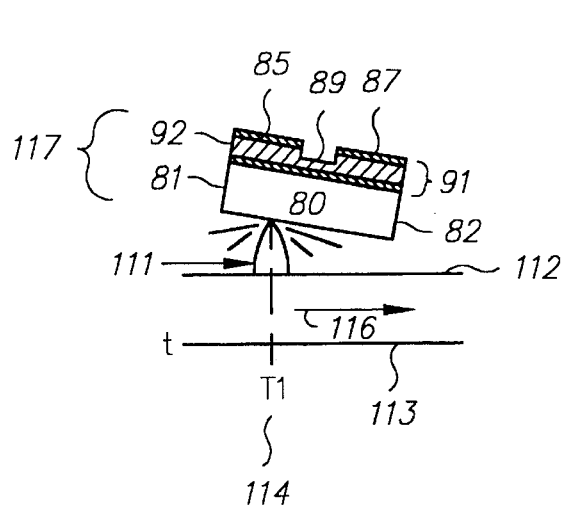
FIG. 8(a) is a side view of the modal sensor structure of FIG. 6 at the time of first contact with a surface asperity.
Figure 8B:
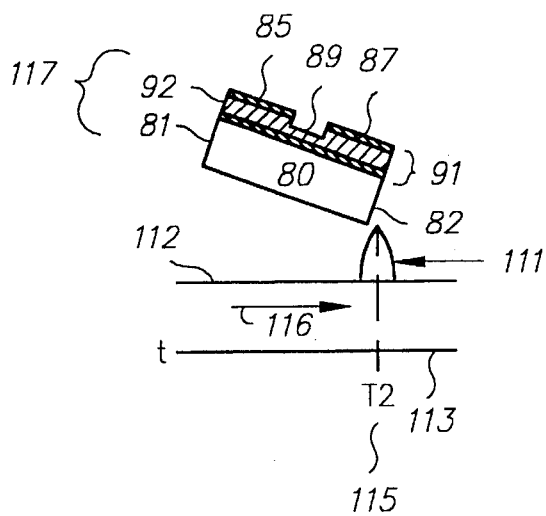
FIG. 8(b) is a side view of the modal sensor of FIG. 6 at the time when contact with a surface asperity is lost.

As shown in FIG. 8, the slider 80 and mounted four-quadrant sensor 118 are suspended over a relatively moving recording surface 112 such as a rotating magnetic disk. As the surface 112 moves in the direction indicated by the arrow 116, contact between the slider 80 and a surface asperity 111 causes high frequency vibrations in the entire structure 117. FIG. 8(a) shows the initial contact at time T1 114, as indicated by a dashed line intersecting the time line 113. FIG. 8(b) shows the release from contact at time T2 115. The vibrations resulting from the impact cause corresponding charge signals to be generated in the four quadrants of the mode selection sensor 118. These charge signals are electrically connected to signal processing means such as those shown in FIG. 9. For example, the signal processing means of FIG. 9 includes a first stage of charge amplifiers 125–128 for receiving input signals 121–124, each followed by a variable gain amplifier 129–132. The input signals 121–124 correspond to the LER, LEH, TER and TEH sensor regions shown in FIG. 6(a). Switching arrangements 133–136 at the summing amplifier input permit the selection of add or subtract mode for each of the four incoming signals 121–124. In the method of the present invention, four independent summing algorithms are used to separate the slider response into its component bending mode signals. The signal combinations are selected by taking advantage of the symmetry of characteristic piezoelectric surface stresses to cancel out unwanted bending mode frequencies.

The four signal combinations of the present method comprise: 1) the difference of the signals of the two diagonal quadrants (LEH−LER−TEH+TER), corresponding to the bending mode response shown in FIG. 5(a); 2) the sum of the signals from all four quadrants (LEH+LER+TEH+TER), corresponding to the bending mode responses of FIGS. 5(b) and (c); 3) the difference of the hub and rim rail signals (LEH−LER+TEH−TER), corresponding to the bending mode response of FIG. 5(d); and 4) the difference of the signals from the leading and trailing end quadrants (LEH+LER−TEH−TER), corresponding to the bending mode response of FIG. 5(e). It shall be understood that the described signal processing may alternatively be performed by a computer program or other appropriate means.

For each summing algorithm, a slider response is sensed during contact with a single robust disk asperity. (See FIG. 8). The processed response at the summing amplifier output 138 may be provided to viewing means such as a monitor. Next, the power spectrum of the output signal is obtained, e.g. by providing the output 138 of the summing amplifier 137 to a power spectrum analyzer. The power spectrum enables one to isolate the bending mode frequency or frequencies corresponding to the summing algorithm.

Experimental results for each of the four summing algorithms obtained for a 100% slider are shown in FIGS. 10–13. In each case, a 4-quadrant sensor structure was suspended over a particulate disk with a single, known asperity. As the slider made contact with the asperity, each of the four quadrant responses was provided to processing means such as those of FIG. 9. The processed signal was displayed on a monitor. For example, FIG. 10(a) shows the contact response waveform obtained by taking the difference of the diagonal quadrant signals. Times T1 141 and T2 142, also shown in FIGS. 8(a) and (b), represent the time of initial slider-asperity contact and the time at which the asperity is released at the slider's trailing edge, respectively. The processed signal was then provided to a spectrum analyzer to obtain its power spectral distribution, as shown in FIG. 10(b). In addition, the power spectrum of the slider without contact was obtained for comparison, as shown in FIG. 10(c). In FIG. 10(b), a peak 143 representing the bending mode frequency is found to occur at approximately 300 kHz.

Figure 11A:
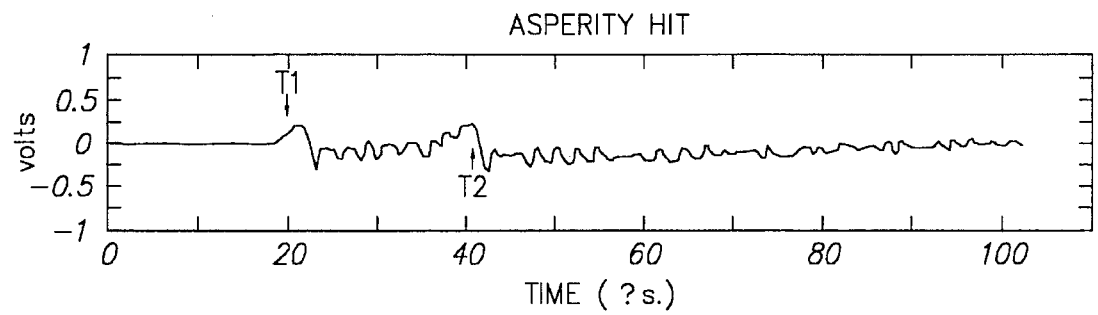
FIGS. 11(a)–(c) represent the slider response to asperity contact, the power spectrum of the response, and the power spectrum of the slider response without asperity contact for the second and third bending modes of a slider.
Figure 11B:
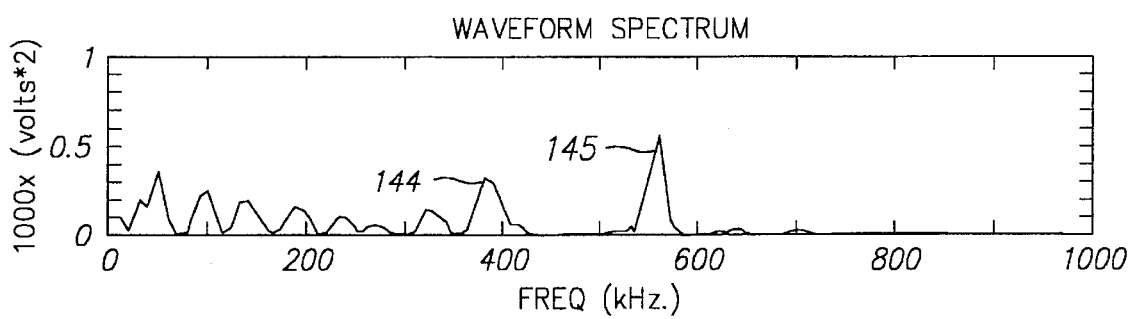
Figure 11C:
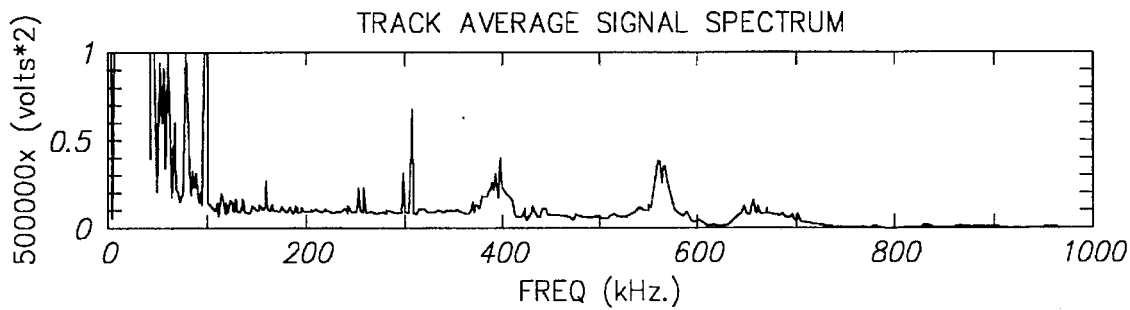
Figure 12A:
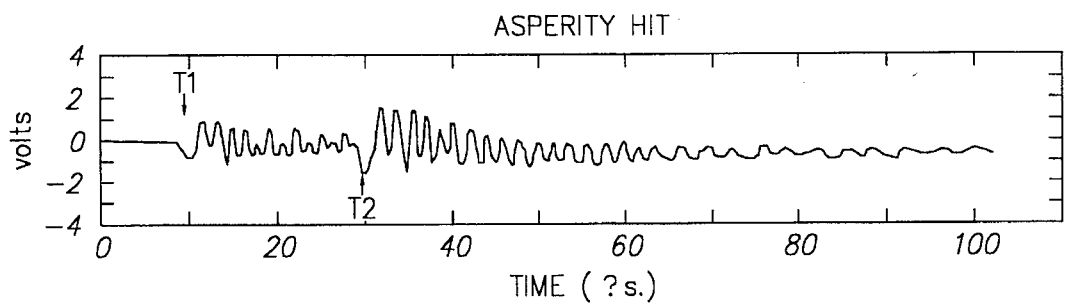
FIGS. 12(a)–(c) represent the slider response to asperity contact, the power spectrum of the response, and the power spectrum of the slider without asperity contact for the fourth bending mode of a slider.
Figure 12B:
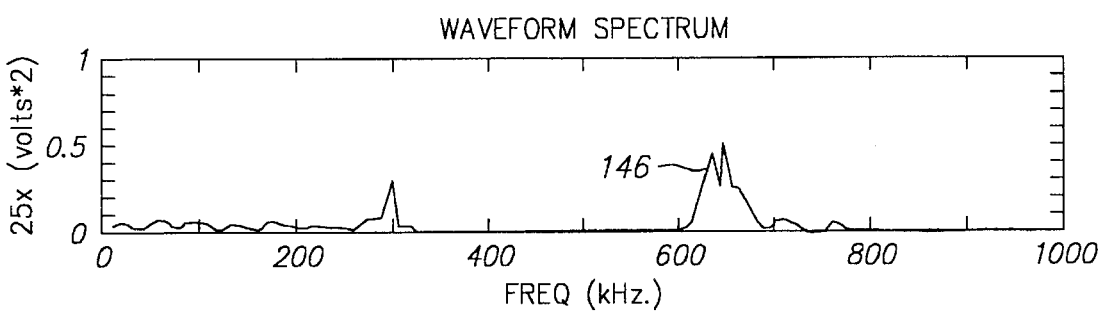
Figure 12C:
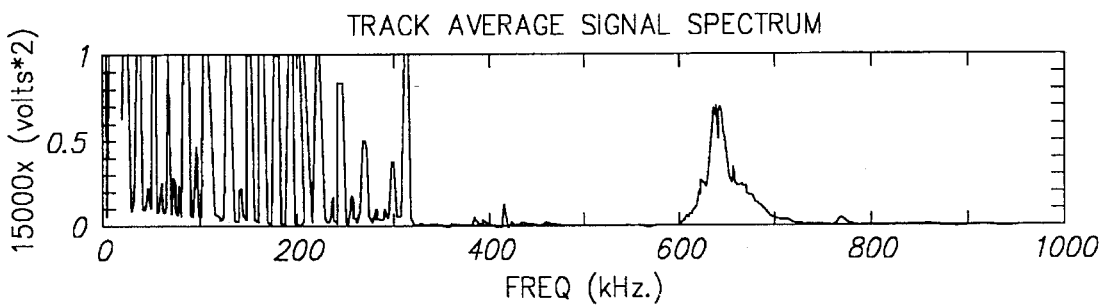
Figure 13A:
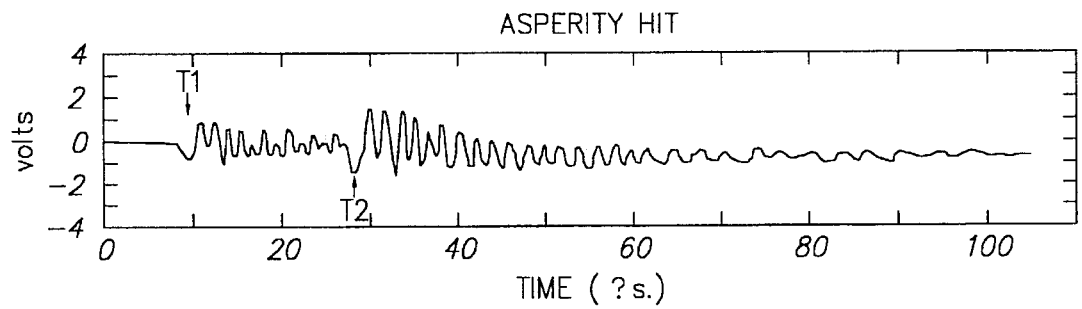
FIGS. 13(a)–(c) represent the slider response to asperity contact, its power spectrum, and the power spectrum of the slider without asperity contact for the fifth bending mode of a slider.
Figure 13B:
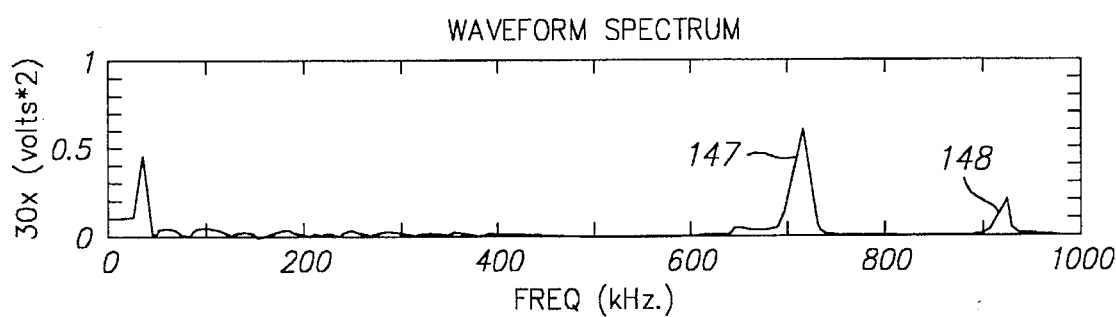
Figure 13C:
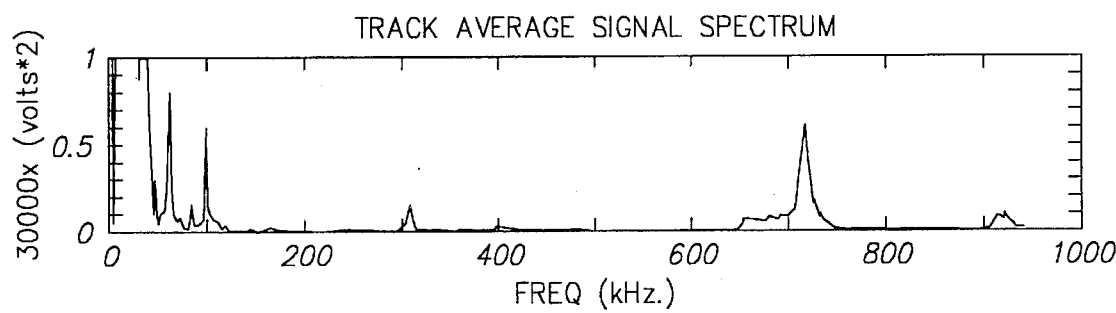

The waveform shown in FIG. 11(a) was obtained by adding the signal contributions of all sensor quadrants. The power spectrum of the waveform in FIG. 11(b) reveals second and third bending mode frequencies 144, 145 of approximately 400 kHz and 550 kHz. Again, the power spectrum of the slider without contact is shown in FIG. 11(c) for reference. FIG. 12(a) represents the slider contact response component found by taking the difference of signals at the slider hub and rim sides. FIG. 12(b) indicates a fourth bending mode frequency 146 of roughly 640 kHz. Finally, the waveform obtained by taking the difference of the signals at the leading and trailing edges of the slider is shown in FIG. 13(a), and fifth and seventh bending mode frequencies 147, 148 of approximately 710 kHz and 860 kHz are identified in FIG. 13(b).

For the alternative two-region sensor of FIG. 7, the signal processing is simpler. For convenience, the region proximate to the slider's leading edge 81 is referred to as LE, and the region at the trailing edge 82 is referred to as TE. This slider geometry permits the isolation of bending modes having modal stress profiles showing either no line of symmetry, or symmetry along the slider's lateral axis. For example, the bending mode components characterized by FIG. 5(b) and (c) may be isolated by summing the signals (LE+TE). Subtraction of the signals (LE−TE) isolates the bending mode components characterized by FIG. 5(e).

Figure 14A:
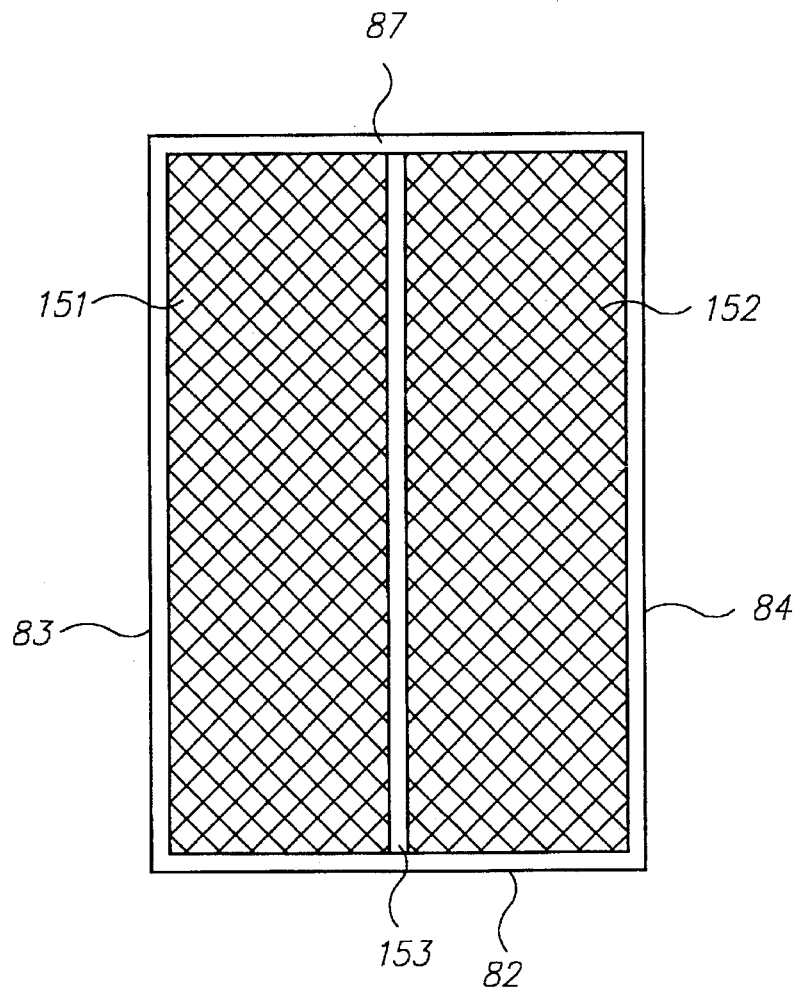
FIGS. 14(a)–(b) are plane and side views, respectively, of an alternative modal sensor for a slider with space limitations.
Figure 14B:
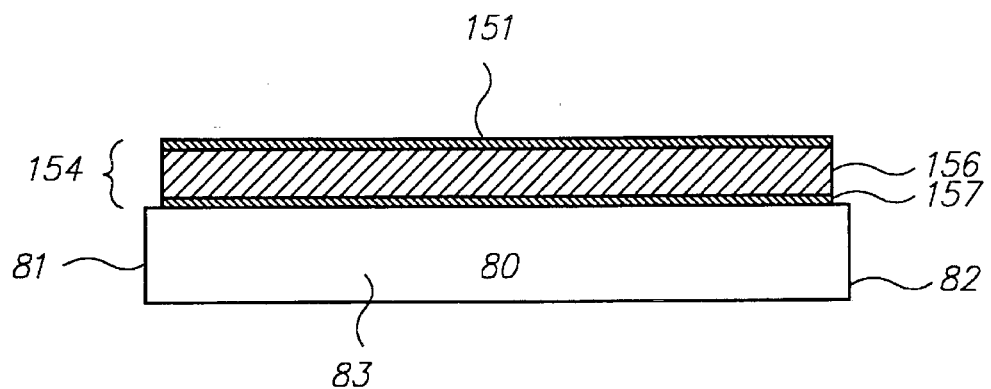

In the event that none of the isolated bending mode components displays monotonic behavior with increasing asperity interference, other bending modes may be analyzed by replacing the two-region mode selection sensor with the four-quadrant embodiment or a two region mode selection sensor such as that shown in FIGS. 14(a)–(b). The embodiment of FIGS. 14(a)–(b) is similar to that of FIGS. 7(a) and 7(b), comprising a sensor 154 mounted on a slider 80. The sensor 154 includes a slab of piezoelectric material 156 such as PZT-5A; an upper layer of conductive material is split into two regions 151, 152 which are coupled to two ports 121, 122 of a charge amplifier (see FIG. 9); and an electrically grounded lower layer of conductive material 157. But in contrast to the sensor of FIGS. 7(a) and 7(b), a longitudinal groove 153 divides the conductive upper layer along the slider's longitudinal axis, rather than along its lateral axis, thereby defining hub and rail regions 151, 152. The hub and rail regions 151, 152 are referred to as H and R for convenience. By subtracting the hub signal from the rail signal (R-H) and taking the power spectrum of the resulting signal, the bending mode component characterized by FIG. 5(d) is obtained. The bending mode components characterized by FIG. 5(b) and (c) are similarly isolated by summing the signals (R+H). To obtain the bending mode component corresponding to FIG. 5(a), however, the four-quadrant mode selection sensor of FIGS. 6(a) and 6(b) is required.

III. Selecting A Monotonic Response

Once the bending mode frequencies have been identified, each is studied by the same signal processing means described above to determine whether any identified mode has a monotonic response with increasing asperity interference. This analysis may be accomplished in a number of ways. For example, the slider's response to contact with a plurality of asperities may be analyzed during a disk spindown. A person familiar with surface analysis testing will understand that spindown testing under these circumstances involves monitoring each of the identified bending mode frequency responses for decreasing relative velocity between the slider and the disk surface, i.e., for decreasing asperity interference height. It should also be readily apparent that conversely, a spin-up test may be performed and each bending mode frequency response analyzed for increasing velocities, i.e., for increasing asperity interference height. In a preferred method, the slider response to contact with a single surface asperity is analyzed over a range of increasing or decreasing interference heights.

Figure 15:
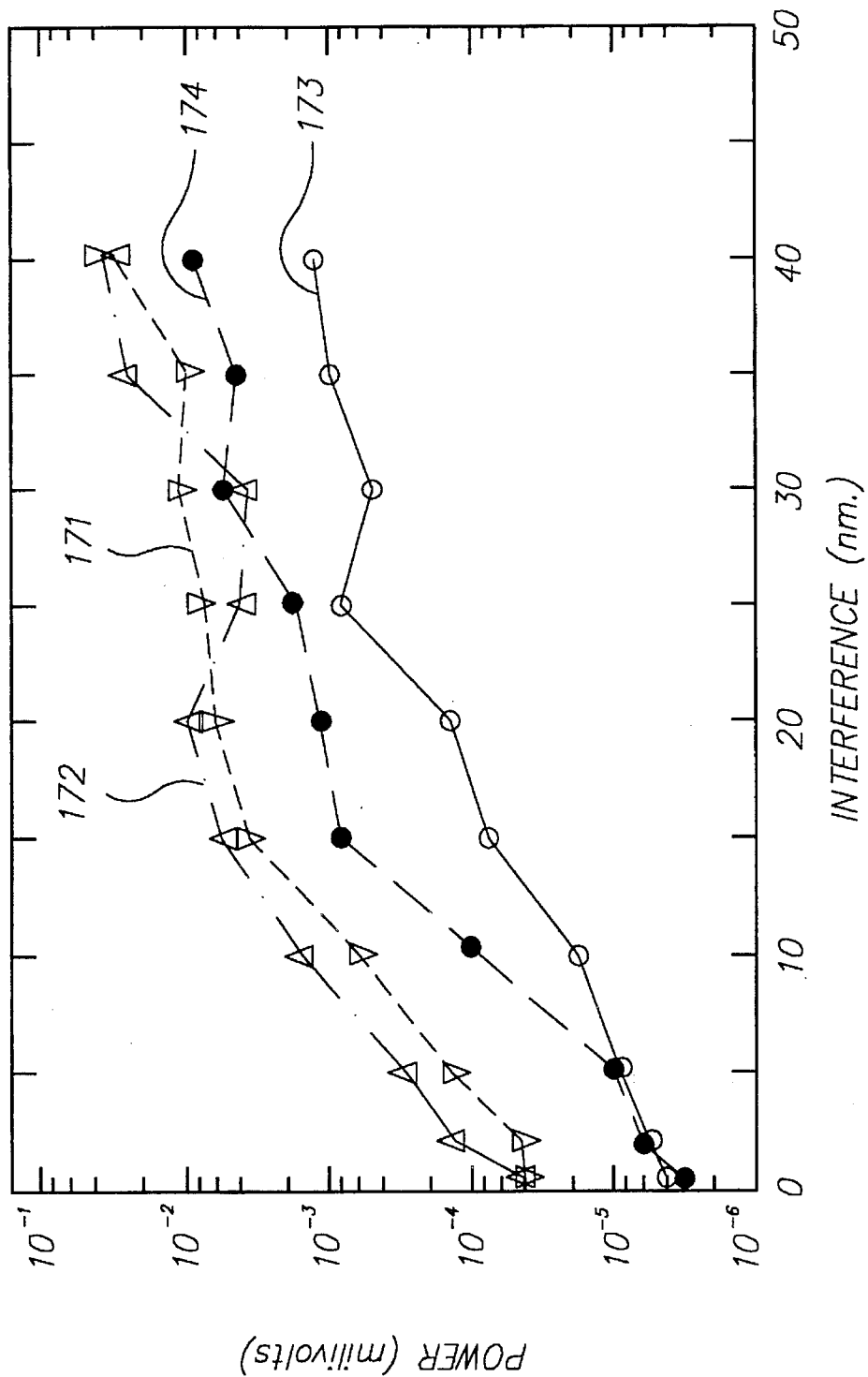
FIG. 15 is a graphical representation of the slider modal responses for increasing slider interference heights.

As an example of the latter method, a large slider mounted with the mode selecting sensor of FIGS. 7(a) and 7(b) was suspended over a magnetic recording disk. FIG. 15 shows the results obtained for the low order bending modes by plotting the signal power of the slider response (in millivolts) versus asperity interference height (in nanometers). The response corresponding to the slider vibration modes of FIGS. 5(b) 171 (the second lowest order bending mode for this slider), (c) 172 (the third bending mode) and (e) 173, 174 (the fifth and seventh bending modes) are shown. In the preferred "single asperity contact analysis", a spectrum analyzer is used to distinguish the contribution of each bending mode frequency in the slider response.

The fifth and seventh bending mode frequencies were experimentally found to be the most suitable candidates for contact detection using a 100% slider. It should be understood that the method of the present invention is applicable to air-bearing and contact sliders of all dimensions and rail configurations, and that the most suitable bending mode frequencies will vary with slider characteristics.

IV. Designing the Optimized Sensor

Figure 16A:
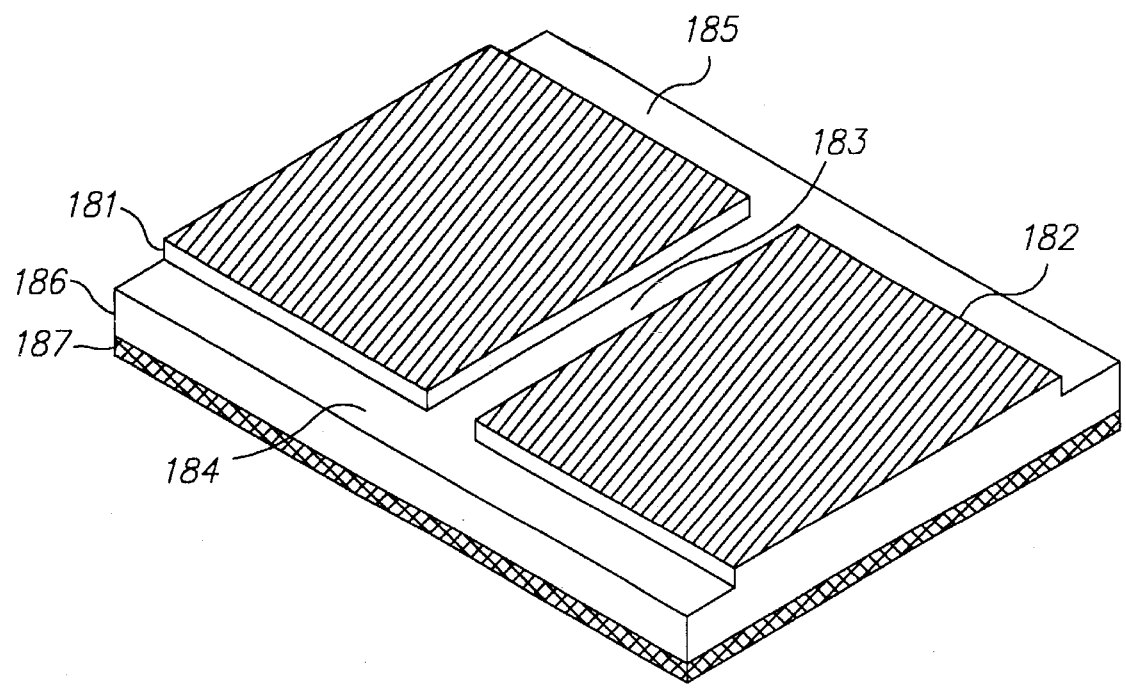
FIG. 16 is a preferred embodiment of an optimized modal sensor for detecting the fifth bending mode of a large slider.
Figure 16B:
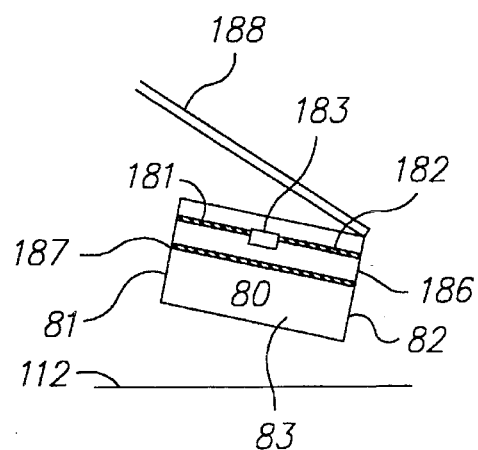

Once the most desirable bending mode or modes have been identified for a given slider size, the modal stress distribution symmetries shown in FIGS. 5(a)–(e) are used to select a sensor design which facilitates isolation of the particular mode(s) of interest, while eliminating the contributions of other modes. For example, the optimized sensor design selected for detection of the fifth bending mode in a large (100%) slider is shown in FIGS. 16(a) and 16(b). One may observe, by revisiting FIG. 5(e), that the sensor of FIGS. 16(a) and 16(b) is tailored to match the symmetry of the fifth bending mode stress components. The sensor comprises a slab of piezoelectric material 186 such as PZT-5A having upper and lower conductive layers. The lower conductive layer 187 is continuous and coupled to the grounded port of an electrical amplifier input. The upper conductive layer is partitioned into two electrically isolated regions 181, 182. One of the upper conductive regions, e.g. region 181, is electrically coupled to the input port 121 of the amplifier in FIG. 9 with switch 133 in the positive position and the other region, e.g. region 182, is coupled to the input port 122 with switch 134 in the negative position. The regions 181, 182 are formed, for example, by first applying a continuous layer of conductive material such as nickel or gold to the upper surface of the piezoelectric layer 186, and then etching a lateral groove 183 (e.g. by chemical etching, laser etching, or RIE) through the conductive layer and a portion of the slab 186. The sensor is mounted to a slider by conventional means such as bonding, and suspended over a surface by suspension means 188. The design shown in FIGS. 16(a) and 16(b) facilitates the detection of the fifth and seventh bending mode frequency responses by subtracting signals generated by regions 181, 182. All lower order modes are eliminated during the subtraction.

In the preferred optimization method, the optimized mode selection sensor is further enhanced by dividing the upper conductive layer into regions 181, 182 wherein the sum of the stress components in each region is substantially positive or negative. For example, in FIG. 5(e), one can see that the stress components of the upper region 72 are substantially negative, and that the components of the lower region 73 are substantially positive. Nevertheless, there are positive components 74 near the vertical edges of region 72. Similarly, there are negative components 75 near the vertical edges of region 73. As previously noted, the charge response of PZT-5A is governed by the sum of the in-plane stresses in the piezoelectric layer. It is therefore desirable to minimize detection of these components 74, 75. Such minimization is accomplished by removing portions of each conductive region 181, 182. Precise tailoring of the regions 181, 182 around the undesirable components may be impractical from a manufacturing standpoint. The preferred approach is to balance the optimal enhanced sensor design with ease of manufacture. By applying this balanced approach, the sensor design of FIG. 16(a) has been enhanced by removing straight portions 184, 185 of the conductive regions 181, 182 along the sensor's lateral edges. Removal of the straight portions eliminates detection of a substantial number of undesirable stress contributions. It should be understood that in some circumstances, a more perfectly tailored sensor may be desirable despite manufacturing complexity. It should further be understood that the enhancement approach just described is applicable to all optimized mode selection sensors.

Figure 17:
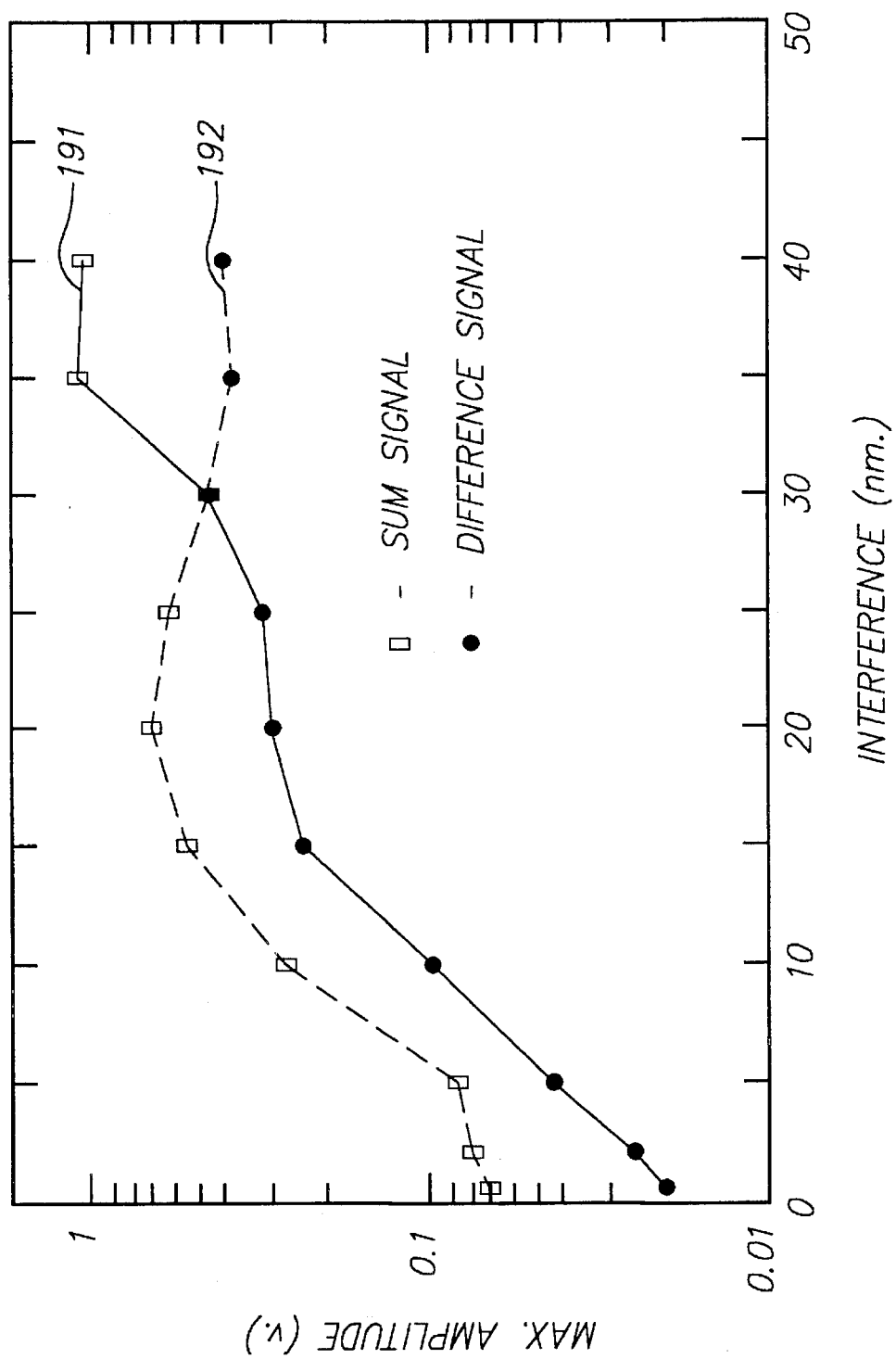
FIG. 17 is a graphical representation of the sum and difference signals obtained for increasing asperity interference for the optimized slider of FIG. 16.

The substantially positive region 181 of FIG. 16(a) is connected to one input port of an amplifier, and the substantially negative region 182 is connected to the other amplifier input. FIG. 17 shows the contact responses obtained by taking the sum 191 and the difference 192 of the signals detected in each region of the enhanced mode selection sensor of FIGS. 16(a) and 16(b) for single asperity contact versus interference height. As can be seen, the difference signal 192 from which the fifth and seventh bending modes are obtained is substantially monotonic for increasing asperity interference.

An optimized mode selection sensor and method for making the same are claimed in U.S. patent application Ser. No. 08/174,948, now U.S. Pat. No. 5,423,207, filed concurrently with the parent case, now U.S. Pat. No. 5,450,747.

Although the present invention has been described with reference to specific embodiments, it should be understood that numerous substitutions and variations can be made in the optimization process, the mode selection sensor design, sensor enhancement and manufacture without departing from the true nature and scope of the present invention which is set forth in the following claims. In particular, this design methodology includes application to all smaller size sliders.

We claim:

1. A four-quadrant mode selection sensor comprising:
   a substantially rectangular layer of piezoelectric material adapted for mounting to a slider and having four quadrants;
   means for sensing charge signals generated in a first one of the four quadrants;
   means for sensing charge signals generated in a second one of the four quadrants;
   means for sensing charge signals generated in a third one of the four quadrants;
   means for sensing charge signals generated in a fourth one of the four quadrants;
   means, coupled to the sensing means, for adding the charge signals from each quadrant to produce a first signal;
   means, coupled to the sensing means, for adding the electric charge signals from a diagonal pair of the quadrants and for subtracting therefrom the electric charge signals from the remaining ones of the quadrants to produce a second signal; and
   means, coupled to the sensing means, for adding the electric charge signals from an adjacent pair of the quadrants and for subtracting therefrom the electric charge signals of the remaining ones of the quadrants to produce at least a third signal.

2. The four-quadrant mode selection sensor of claim 1 wherein the piezoelectric layer further comprises a lower surface comprising a first layer of conductive material to be placed in contact with a slider, and an upper surface comprising a second layer of conductive material having four electrically isolated sensor regions symmetrical about the lateral and longitudinal axes of the layer, and further comprising means for conducting charge signals from the four electrically isolated sensor regions to the adding and subtracting means.

3. The four-quadrant mode selection sensor of claim 2, wherein said four sensor regions are defined by first and second intersecting grooves etched through said second layer of conductive material along the lateral and longitudinal axes of said piezoelectric layer, respectively.

4. The four-quadrant mode selection sensor of claim 1, wherein the adjacent pair of quadrants comprise two quadrants on a same side of the lateral axis of the layer.

5. The four-quadrant mode selection sensor of claim 1, wherein the adjacent pair of quadrants comprise two quadrants on a same side of the longitudinal axis of the layer.

6. The four-quadrant mode selection sensor of claim 1, further comprising means for suspending the slider over a relatively moving surface, wherein contact between said slider and the surface causes the slider to vibrate and wherein the vibration comprises a plurality of flexural bending mode frequency components.

7. The four-quadrant mode selection sensor of claim 6, further comprising means monitoring each of the signals from adding and subtracting means for increasing asperity interference heights to determine which, if any, has a monotonic response.

8. The surface analysis apparatus of claim 1, further comprising means for generating power spectra for each of the signals from the adding and subtracting means and for monitoring each of the power spectra for a monotonic response with increasing asperity interference height.

9. The four-quadrant mode selection sensor of claim 1, wherein said piezoelectric layer comprises PZT-5A.

10. The four-quadrant mode selection sensor of claim 2, wherein said first and second layers of conductive material comprise nickel.

* * * * *